(12) United States Patent
Mori

(10) Patent No.: US 8,894,131 B2
(45) Date of Patent: Nov. 25, 2014

(54) VEHICLE PILLAR STRUCTURE

(75) Inventor: Takeo Mori, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/880,624

(22) PCT Filed: Nov. 22, 2011

(86) PCT No.: PCT/IB2011/002767
§ 371 (c)(1),
(2), (4) Date: Apr. 19, 2013

(87) PCT Pub. No.: WO2012/076948
PCT Pub. Date: Jun. 14, 2012

(65) Prior Publication Data
US 2013/0241239 A1  Sep. 19, 2013

(30) Foreign Application Priority Data

Dec. 7, 2010 (JP) .................................. 2010-272792

(51) Int. Cl.
*B60N 99/00* (2006.01)
*B62D 25/04* (2006.01)
*B62D 21/15* (2006.01)
(52) U.S. Cl.
CPC .............. *B62D 25/04* (2013.01); *B62D 21/157* (2013.01)
USPC .................................................... 296/193.06

(58) Field of Classification Search
USPC .............. 296/187.12, 193.05, 193.06, 203.03
See application file for complete search history.

(56) References Cited

U.S. PATENT DOCUMENTS

| | | | |
|---|---|---|---|
| 6,474,726 B1 * | 11/2002 | Hanakawa et al. | 296/191 |
| 7,677,645 B2 * | 3/2010 | Henkelmann | 296/187.12 |
| 7,959,217 B2 * | 6/2011 | Onuma | 296/187.12 |
| 2008/0315628 A1 * | 12/2008 | Obayashi | 296/193.06 |
| 2010/0038928 A1 * | 2/2010 | Onuma | 296/187.12 |
| 2010/0194146 A1 | 8/2010 | Nishimura et al. | |
| 2011/0101734 A1 * | 5/2011 | Gunther et al. | 296/193.06 |
| 2011/0133515 A1 * | 6/2011 | Mori | 296/193.06 |

FOREIGN PATENT DOCUMENTS

| | | |
|---|---|---|
| JP | A-2000-142466 | 5/2000 |
| JP | A-2001-163257 | 6/2001 |
| JP | A-2005-7949 | 1/2005 |
| JP | A 2005-247002 | 9/2005 |
| JP | A 2006-321491 | 11/2006 |
| JP | A 2007-55494 | 3/2007 |
| JP | A 2010-173562 | 8/2010 |
| WO | WO 2011/128759 A1 | 10/2011 |

* cited by examiner

*Primary Examiner* — Lori Lyjak
(74) *Attorney, Agent, or Firm* — Oliff PLC

(57) ABSTRACT

A vehicle pillar structure includes a reinforcement that is provided in a vehicle pillar and that includes a buckling portion and a strain reducing face portion, wherein the buckling portion serves as a starting point of buckling; and the strain reducing face portion is adjacent to the buckling portion in a lateral direction of the reinforcement and reduces strain that occurs when the buckling.

12 Claims, 11 Drawing Sheets

VEHICLE PILLAR STRUCTURE

BACKGROUND OF THE INVENTION

1. Field of the Invention

The invention relates to a vehicle pillar structure that includes a buckling portion.

2. Description of the Related Art

A known technology in this technical field is described in Japanese Patent Application Publication No. 2005-7949 (JP-A-2005-7949). A center pillar described in Japanese Patent Application Publication No. 2005-7949 (JP-A-2005-7949) is provided with a reinforcement made of metal, and the reinforcement is provided with a recessed buckling portion that serves as a starting point of buckling. Therefore, when external force acts on the center pillar, the center pillar starts buckling at the buckling portion, and the metal reinforcement undergoes an extending deformation, whereby energy of the external force may be absorbed.

However, in the conventional pillar structure described above, although the reinforcement is provided with the buckling portion in order to control the buckling deformation of the pillar, the strain that occurs at the buckling portion of the reinforcement is large, so that an ideal deformation mode of the pillar cannot be obtained.

In addition, because the strain that occurs at the buckling portion is large, it may be difficult to control the deformation mode of the pillar, such as when the reinforcement is formed from a high-tensile steel with low extensibility.

SUMMARY OF THE INVENTION

The invention provides a vehicle pillar structure that reduces strain of a pillar caused by buckling and that facilitates control of the deformation mode of the pillar.

A first aspect of the invention relates to a vehicle pillar structure. The vehicle pillar structure includes a reinforcement that is provided in a vehicle pillar and that includes a buckling portion and a strain reducing face portion, wherein the buckling portion serves as a starting point of buckling; and the strain reducing face portion is adjacent to the buckling portion in a lateral direction of the reinforcement and reduces strain that occurs when the buckling.

According to the pillar structure described above, by providing the strain reducing face portion, it is possible to reduce the strain that occurs starting at the buckling portion when the pillar buckles in response to an external force. Thus, an ideal deformation mode of the pillar can be obtained. In addition, the strain caused by buckling can be reduced even if the reinforcement is formed from a high-tensile steel sheet with low extensibility. Therefore, it is possible to facilitate control of the deformation mode of the pillar.

In the vehicle pillar structure described above, the strain reducing face portion may be inclined relative to a first face of the reinforcement in which the buckling portion is formed, and an inclination angle of the strain reducing face portion relative to the first face may be set according to buckling strength of the buckling portion.

Generally, the strain caused by buckling increases as the buckling strength of the buckling portion becomes higher. Further, the degree of reduction of the strain caused by buckling changes by changing the inclination angle of the strain reducing face portion relative to a face of the reinforcement in which the buckling portion is formed. Accordingly, by setting the inclination angle of the strain reducing face portion relative to the face according to the buckling strength of the buckling portion, it is possible to more suitably reduce the strain caused by the buckling.

In the vehicle pillar structure described above, the buckling portion may be formed by reducing width of a first face of the reinforcement, and the strain reducing face portion may be inclined relative to the first face of the reinforcement. In this case, an inclination angle of the strain reducing face portion relative to the first face of the reinforcement may be set according to the width of the first face of the reinforcement in the buckling portion.

The buckling strength of the buckling portion is low, if the width of the reinforcement at which the buckling portion is formed is narrow and the inclination of the strain reducing face portion relative to a face of the reinforcement in which the buckling portion is formed is gentle. On the other hand, the buckling strength of the buckling portion is high, if the width of the reinforcement at which the buckling portion is formed is wide and the inclination of the strain reducing face portion relative to a face of the reinforcement in which the buckling portion is formed is steep. Thus, according to the construction described above, while the desired buckling strength can be obtained by adjusting the width of the reinforcement in the buckling portion and the inclination angle of the strain reducing face portion, it is possible to suitably reduce the strain caused by the buckling.

In the vehicle pillar structure described above, a plurality of buckling portions may be juxtaposed in a vertical direction of the reinforcement, and a plurality of strain reducing face portions may be adjacent to the buckling portions. In this case, each buckling portion may have a different buckling strength, and each strain reducing face portion may have a different inclination angle relative to a first face of the reinforcement in which the buckling portions are formed, and the strain reducing face portions may be connected to each other. Furthermore, the buckling portions may include a first buckling portion and a second buckling portion, and the first buckling portion may be provided between one of the buckling portions and the second buckling portion in the lateral direction of the reinforcement.

When the pillar buckles, the buckling portions buckle sequentially in the order from the buckling portion with the lowest buckling strength to the buckling portion with the highest buckling strength, and therefore the strain reducing portions serve to reduce the strain by the buckling sequentially in the order from the strain reducing face portion adjacent to the buckling portion with the lowest buckling strength to the strain reducing face portion adjacent to the buckling portion with the highest buckling strength. According to the construction described above, because the strain reducing face portions that are different in the inclination angle relative to a face of the reinforcement are interconnected, strain caused in a strain reducing face portion is restrained from propagating to an adjacent strain reducing face portion via the interface between the two strain reducing face portions. Therefore, one buckling portion may buckle without being affected by the strain of the other buckling portion that has already buckled, so that a more suitable deformation mode can be obtained.

In the vehicle pillar structure described above, a plurality of buckling portions may be juxtaposed in a vertical direction of the reinforcement, and a plurality of buckling portions may be constructed of V-shaped grooves whose cross sectional shapes are substantially same. In this case, the buckling portions may include a first buckling portion and a second buckling portion, and a bottom portion of the first buckling portion may be provided with a protrusion and the bottom portion of the second buckling portion is not provided with the protrusion.

According to the construction described above, when the V-shaped groove with the protrusion buckles, the protrusion serves to inhibit the deformation of the groove. That is, by providing the protrusion on the bottom portion of the groove, the buckling strength of the groove may be increased. Thus, by providing the groove whose bottom portion is provided with the protrusion and the groove whose bottom portion is not provided with the protrusion, the upper groove may have different buckling strength from the lower groove. Therefore, it is possible to deform the pillar in a desired deformation mode.

In the vehicle pillar structure described above, the buckling portion may be constructed of a recessed portion that is formed in the reinforcement and that includes a bottom face portion, an upper wall portion and a lower wall portion, and the upper wall portion may be connected to an upper end of the bottom face portion and the lower wall portion may be connected to an lower end of the bottom face portion. In this case, an angle between the upper wall portion and the bottom face portion may differ from the angle between the lower wall portion and the bottom face portion.

The buckling strength of the interface between the wall portion and the bottom face portion becomes lower as the angle between the wall portion and the bottom face portion decreases. According to the above-described construction, an upper side portion of the recessed portion may have different buckling strength from a lower side portion of the recessed portion. Therefore, it is possible to deform the pillar in a desired deformation mode.

In the vehicle pillar structure described above, the buckling portion may be formed in an obverse face of the reinforcement, and the strain reducing face portion may be provided between the obverse face and a side face of the reinforcement. In this case, at least one of the strain reducing face portion and the side face may be curved outward in the lateral direction of the reinforcement.

According to the above-described construction, when the obverse face of the reinforcement receives external force and the pillar buckles, the at least one of the strain reducing face portion and the side face deforms to protrude outward, without deforming to fall inward. The deformation in this manner is caused by the configuration the at least one of the strain reducing face portion and the side face. Accordingly, the strain occurs in the strain reducing face portion and the side face can be reduced, so that a more suitable deformation mode can be obtained.

In the vehicle pillar structure described above, the reinforcement may include an obverse face and a side face, and the buckling portion may be formed in the obverse face, and the strain reducing face portion may be provided between the obverse face and the side face. An angle between the strain reducing face portion and the obverse face of the reinforcement may be larger than the angle of between the side face of the reinforcement and the obverse face of the reinforcement.

In the vehicle pillar structure described above, buckling strength of an upper side portion of the buckling portion may differ from the buckling strength of a lower side portion of the buckling portion.

In the vehicle pillar structure described above, the buckling strength of the lower side portion of the buckling portion may be lower than the buckling strength of the upper side portion of the buckling portion.

In the vehicle pillar structure described above, a plurality of buckling portions may be juxtaposed in a vertical direction of the reinforcement, and each buckling portion may have a different buckling strength.

In the vehicle pillar structure described above, the buckling strength of the lower buckling portion may be lower than the buckling strength of the upper buckling portion.

In the vehicle pillar structure described above, an upper strain reducing face portion may be adjacent to the upper buckling portion, and a lower strain reducing face portion may be adjacent to the lower buckling portion. In this case, an inclination angle of the upper strain reducing face portion relative to the obverse face of the reinforcement may be larger than the inclination angle of the lower strain reducing face portion relative to the obverse face of the reinforcement.

In the vehicle pillar structure described above, an upper side portion of the strain reducing face portion may be adjacent to the upper buckling portion, and a lower side portion of the strain reducing face portion may be adjacent to the lower buckling portion. In this case, an inclination angle of the upper side portion of the strain reducing face portion relative to the obverse face of the reinforcement may be larger than the inclination angle of the lower side portion of the strain reducing face portion relative to the obverse face of the reinforcement.

According to the constructions described above, it is possible to reduce the stain of the pillar caused by buckling and thereby to facilitate control of the deformation mode of the pillar.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 11A is a sectional view showing the reinforcement in the second embodiment undergoing deformation in a side collision.

DETAILED DESCRIPTION OF EMBODIMENTS

Figure 1:
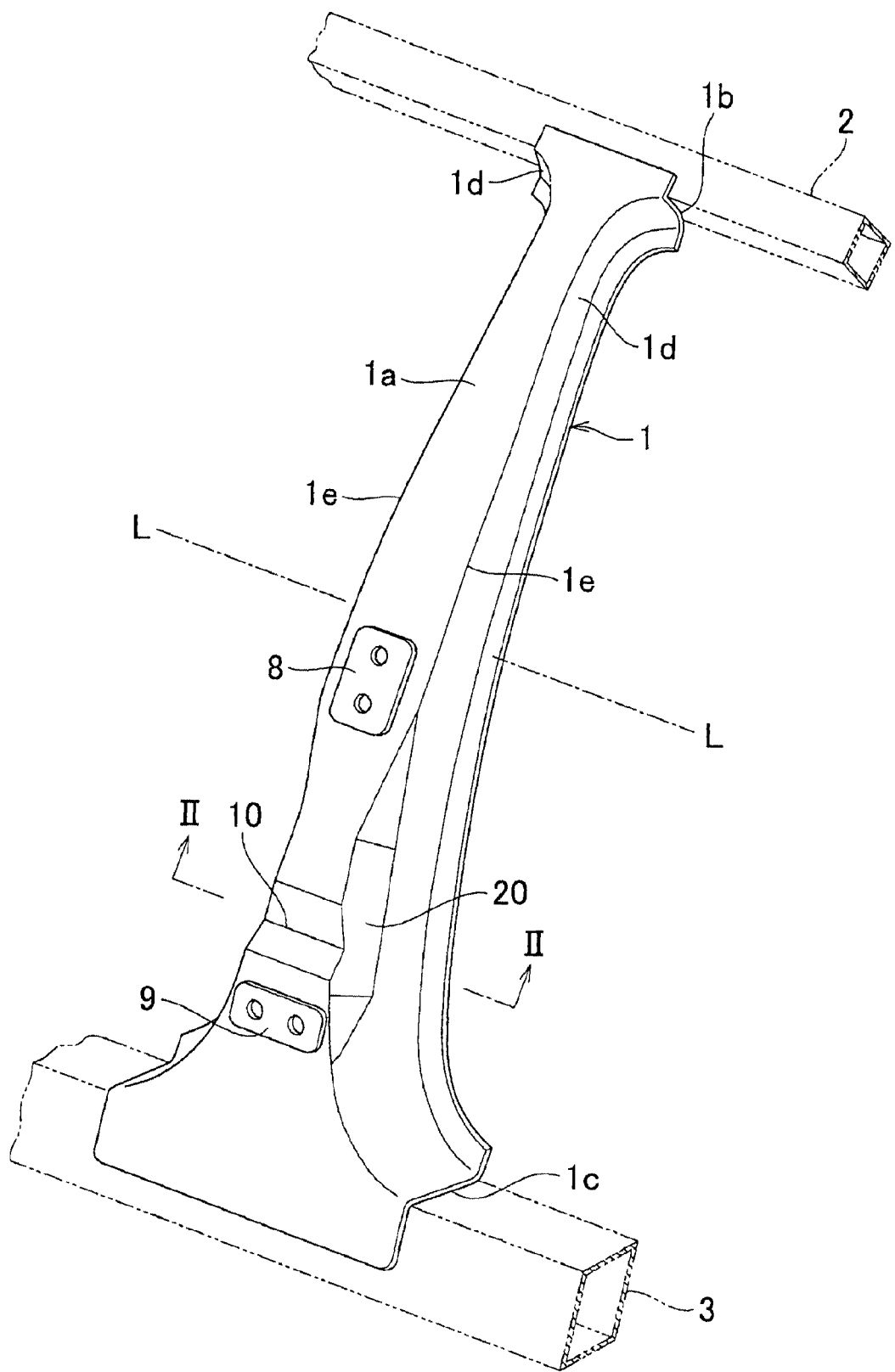
FIG. 1 is a perspective view showing a first embodiment of a reinforcement that is applied to a pillar structure in accordance with the invention.

Hereinafter, embodiments of a vehicle pillar structure in accordance with the invention will be described in detail with reference to the drawings. In descriptions of the first to seventh embodiments, the same components are denoted by the same reference characters, and redundant descriptions will be avoided.

First Embodiment

Figure 2:
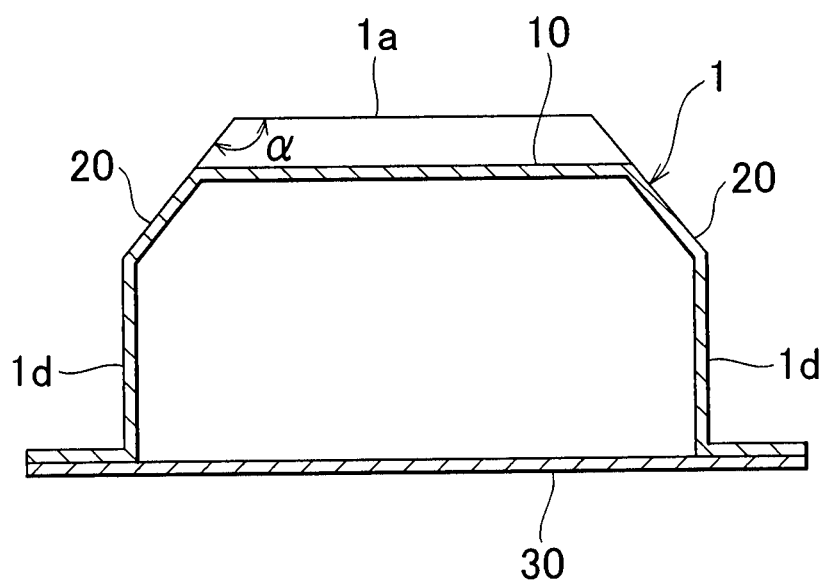
FIG. 2 is a sectional view taken along line in FIG. 1.

As shown in FIG. 1 and FIG. 2, a reinforcement 1 of a center pillar (B pillar) extends between a roof side rail 2 and a rocker 3, as shown in FIG. 1 and FIG. 2. An upper portion of the reinforcement 1 is provided with an upper attachment portion 1b for welding the reinforcement 1 to the roof side rail 2. A lower portion of the reinforcement 1 is provided with a lower attachment portion 1c for welding the reinforcement 1 to the rocker 3.

Furthermore, the reinforcement 1 is provided with an upper hinge seat portion 8 and a lower hinge seat portion 9 to which the hinges of a door are fixed. In the center pillar, an outer surface of the reinforcement 1 constructed as described above is covered with a side outer panel (not shown).

A front pillar (A pillar) serves to support a vehicle cabin in the event of a head-on collision or an offset collision. On the other hand, the center pillar serves to support the vehicle cabin in the event of a side collision. When a side collision occurs, in view of the protection of the head of an occupant, crash of the roof may be controlled by preventing the upper half of the center pillar, that is, the portion above the beltline L, from collapsing inward.

Therefore, in an obverse face 1a of the reinforcement 1, a bead 10 that forms a V-shape groove extending in the lateral direction of the reinforcement 1 is provided below the beltline L. The bead 10 serves as a starting point of buckling (initial buckling point) of the reinforcement 1 when an external force acts on the reinforcement. The bead is a recessed portion, such as a groove, formed on the obverse face 1a, and serves as a buckling portion.

Strain reducing face portions 20 are formed on two ridge portions 1e positioned at both sides of the obverse face 1a of the reinforcement 1. The strain reducing face portions 20 are positioned adjacent to the bead 10 in the lateral (horizontal) direction of the reinforcement 1. The strain reducing face portions 20 are formed as chamfered ridge portions 1e. Each strain reducing face portion 20 extends in the vertical (longitudinal) direction of the reinforcement 1. Each strain reducing face portion 20 may be configured so that an angle between the strain reducing face portion 20 and the obverse face 1a of the reinforcement 1 is larger than the angle of between a side face 1d of the reinforcement 1 and the obverse face 1a of the reinforcement 1A; 1B; 1C; 1D; 1E; 1F. As shown in FIG. 2, each strain reducing face portion 20 is inclined relative to the obverse face 1a of the reinforcement 1, and the inclination angle α of each strain reducing face portion 20 relative to the obverse face 1a is a gentle angle (an open angle α between each strain reducing face portion 20 and the obverse face 1a is large).

The reinforcement 1 described above is formed to have a generally U-shaped cross section by pressing a high-tensile steel sheet. The high-tensile steel sheet may have a high strength, for example, a tensile strength of 1000 MPa or more.

The opening of the U sectional shape of the reinforcement 1 may be covered with a back plate 30.

As described above, when a side collision of the vehicle occurs, the reinforcement 1 starts buckling from the bead 10. Because the inclination angle of each strain reducing face portion 20 relative to the obverse face 1a of the reinforcement 1 is a gentle angle, the strain starting at the bead 10 may be reduced in comparison with the case of the related art; in which no strain reducing face portion is provided. The strain caused by buckling can be reduced in this manner, and thus, an ideal deformation mode of the pillar can be obtained.

In addition, the strain caused by buckling can be reduced even if the reinforcement 1 is formed from a high-tensile steel sheet with low extensibility. Therefore, it is possible to facilitate control of the deformation mode of the pillar. That is, even if the entire reinforcement 1 is formed from a high-tensile steel sheet in order to secure a strength of the upper portion of the reinforcement 1 above the beltline L, providing the strain reducing face portions 20 adjacent to the bead 10 makes it possible to cause the lower portion of the reinforcement 1 below the beltline L to deform at the buckling position without involving large strain. This eliminates the need for, for example, using different steel sheet between the upper potion and the lower portion of the reinforcement below the beltline L so that the lower portion is formed from a high-tensile steel sheet in order to buckle the lower portion. Thus, the entire reinforcement 1 may be formed of a single kind of material, and therefore it is possible to facilitate the production process and reduce the production cost.

Second Embodiment

Figure 3:
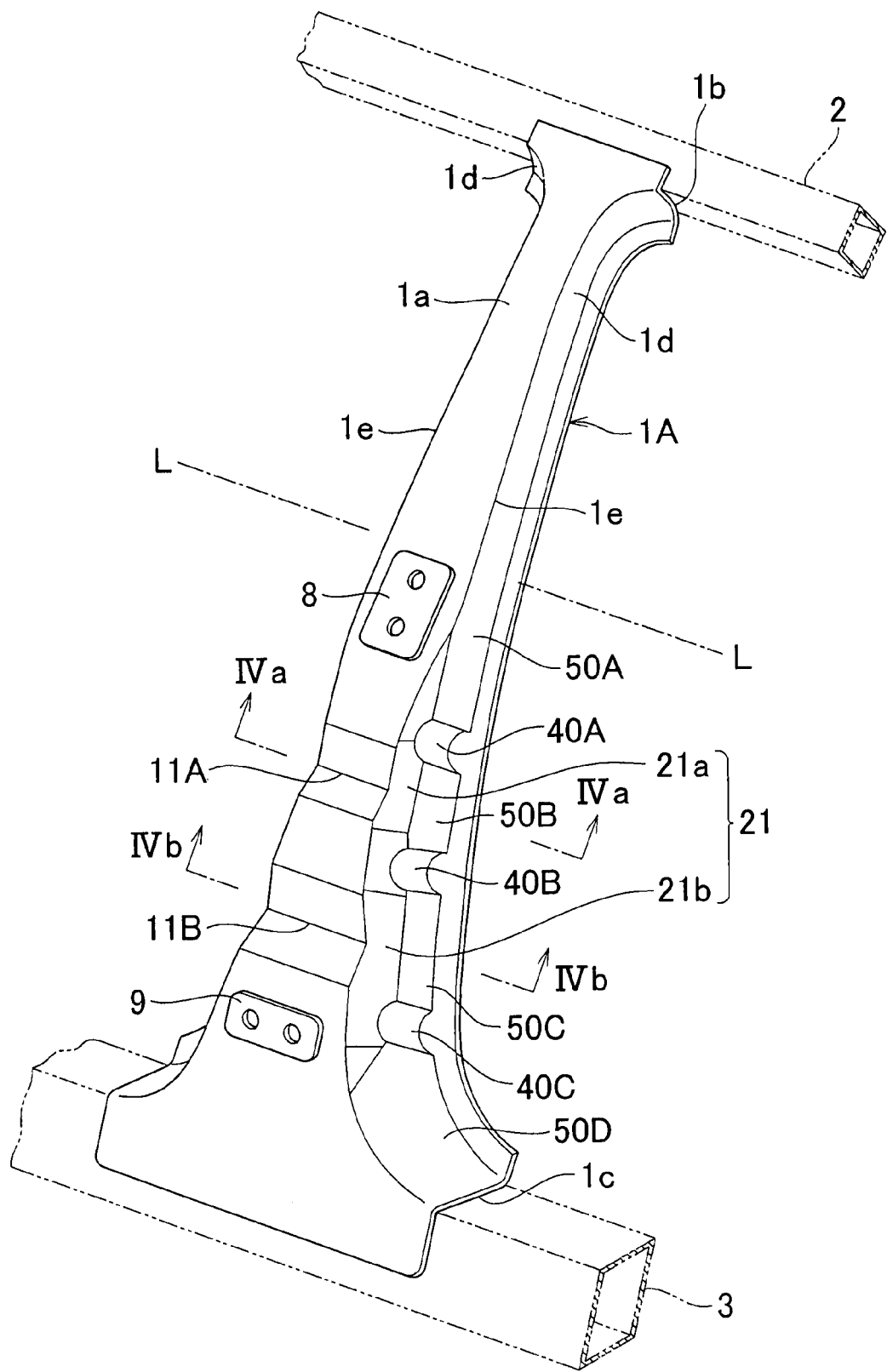
FIG. 3 is a perspective view showing a second embodiment of the reinforcement that is applied to a pillar structure in accordance with the invention.
Figure 4A:
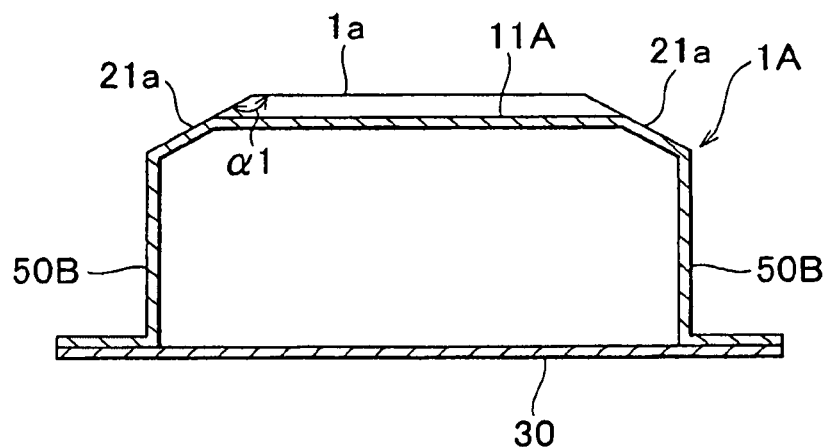
FIG. 4A is a sectional view taken along line IVa-IVa in FIG. 3.
Figure 4B:
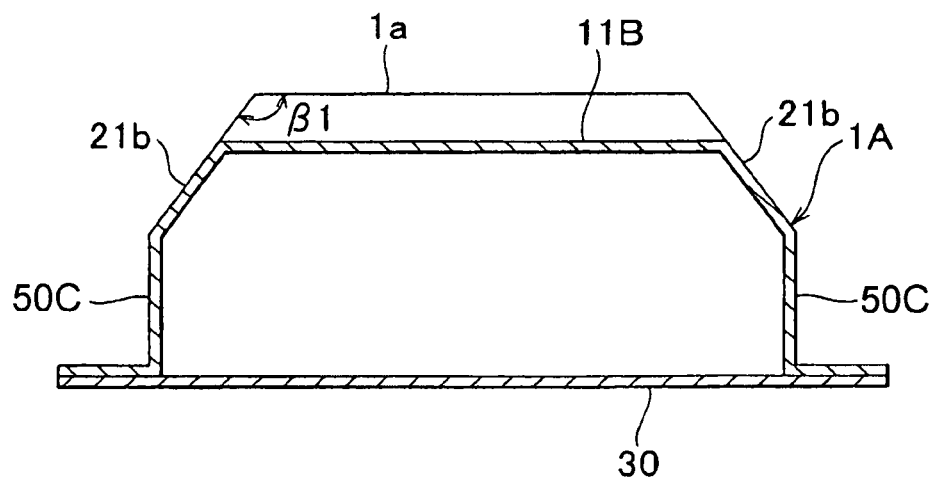
FIG. 4B is a sectional view taken along line IVb-IVb in FIG. 3.

As shown in FIG. 3 and FIGS. 4A and 4B, an obverse face 1a of a reinforcement 1A of a center pillar has beads (buckling portions) 11A and 11B, which are provided in the stated order from above between the upper hinge seat portion 8 and the lower hinge seat portion 9. Both of the upper hinge seat portion 8 and the lower hinge seat portion 9 are positioned below the beltline L. The beads 11A and 11B each form a V-shape groove that extends in the lateral direction of the reinforcement 1A, and the groove of the bead 11B has a greater depth than the groove of the bead 11A. As for the beads of this kind, the deeper the groove is, the lower the buckling strength is. Therefore, the buckling strength of the bead 11B is lower than the buckling strength of the bead 11A. The beads 11A and 11B serve as starting points when the reinforcement 1A buckles in response to an external force.

Beads 40A, 40B and 40C are formed in the side face 1d on each side of the obverse face 1a. The bead 40A is provided at a height position above the bead 11A. The bead 40B is provided at a height position between the beads 11A and 11B. The bead 40C is provided at a height position below the bead 11B. Each of the beads 40A to 40C extends across the corresponding side face 1d in the width direction of the side face. Thus, the side faces 1d are divided by the beads 40A to 40C. That is, each side face 1d is divided into a side face 50A above the bead 40A, a side face 50B between the bead 40A and the bead 40B, a side face 50C between the bead 40B and the bead 40C, and a side face 50D below the bead 40C.

Strain reducing face portions 21 are formed on two ridge portions 1e positioned at both sides of the obverse face 1a of the reinforcement 1A. The strain reducing face portions 21 are positioned adjacent to the beads 11A and 11B in the lateral direction of the reinforcement 1A. The strain reducing face portions 21 are formed as chamfered ridge portions 1e. Each strain reducing face portion 21 extends in the vertical (longitudinal) direction of the reinforcement 1.

Each strain reducing face portion 21 includes a strain reducing face portion 21a that is provided adjacent to the bead 11A, and a strain reducing face portion 21b that is provided adjacent to the bead 11B. In each strain reducing face portion 21, one end of the strain reducing face portion 21a is near the bead 11A, and the opposite end thereof is near the corresponding side face 50B. Likewise, one end portion of the strain reducing face portion 21b is near the bead 11B, and the opposite end thereof is near the corresponding side face 50C.

Furthermore, the inclination angle α1 of the strain reducing face portion 21a relative to the obverse face 1a of the reinforcement 1A (i.e., the open angle between the strain reducing face portion 21a and the obverse face 1a), as shown in FIG. 4A, is gentler (greater in the open angle) than the inclination angle β1 of the strain reducing face portion 21b relative to the obverse face 1a of the reinforcement 1A (i.e., the open angle between the strain reducing face portion 21b and the obverse face 1a), as shown in FIG. 4B. By increasing the width of the side face, as in the case of the side faces 50B adjacent to the strain reducing face portions 21a, the inclination angle α1 of the corresponding strain reducing face portion 21a relative to the obverse face 1a becomes gentler. Conversely, by decreasing the width of the side face, as in the case of the side faces 50C adjacent to the strain reducing face portions 21b, the inclination angle β1 of the corresponding strain reducing face portion 21b relative to the obverse face 1a becomes sharper.

The reinforcement 1A as described above may be formed by pressing a high-tensile steel sheet.

As described above, when a side collision occurs, the reinforcement 1 buckles, with the beads 11A and 11B serving as starting points of buckling. Then, the beads 11A and 11B buckle in the order of the bead 11B, whose buckling strength is lower, and the bead 11A, whose buckling strength is higher. Besides, when a bead having a higher buckling strength buckles, there occurs a greater strain than when a bead having a lower buckling strength buckles. Therefore, because the strain reducing face portions 21a adjacent to the bead 11A are connected to the obverse face 1a at the gentle angle α1, the strain that occurs starting at the higher buckling strength bead 11A (starting point) can be more suitably reduced than in the case where the strain reducing face portions 21a are connected to the bead 11A at a sharper angle. Thus, by setting the inclination angles of the strain reducing face portions 21a and 21b relative to the obverse face 1a according to the buckling strengths of the beads 11A and 11B, the strain caused by buckling can be more suitably reduced.

Because the strain caused by buckling can be reduced, the ideal deformation mode of the pillar can be obtained. In addition, the strain caused by buckling can be reduced even if the reinforcement 1 is formed from a high-tensile steel sheet with low extensibility. Therefore, it is possible to facilitate control of the deformation mode of the pillar. That is, even if the entire reinforcement 1A is formed from a high-tensile steel sheet in order to secure a strength of the upper portion of the reinforcement 1A above the beltline L, the lower portion of the reinforcement 1A below the beltline L can deform at the buckling position without involving large strain. Thus, the entire reinforcement 1A may be formed of a single kind of material, and therefore it is possible to facilitate the production process and reduce the production cost.

In addition, by forming the beads 40A to 40C in the side faces 1d, when the lower portion of the reinforcement 1A deforms, the beads 40A to 40C brace so as to restrain complete crush of the lower portion of the reinforcement 1A. Thus, deformation of the pillar may be restrained.

In addition, the amount of crush of the reinforcement 1A may be controlled by changing the heights of the beads 40A to 40C (i.e., the lengths thereof in the width direction of the side faces 1d) according to the inclination angles of the strain reducing face portions 21a and 21b relative to the obverse face 1a.

Third Embodiment

Figure 5:
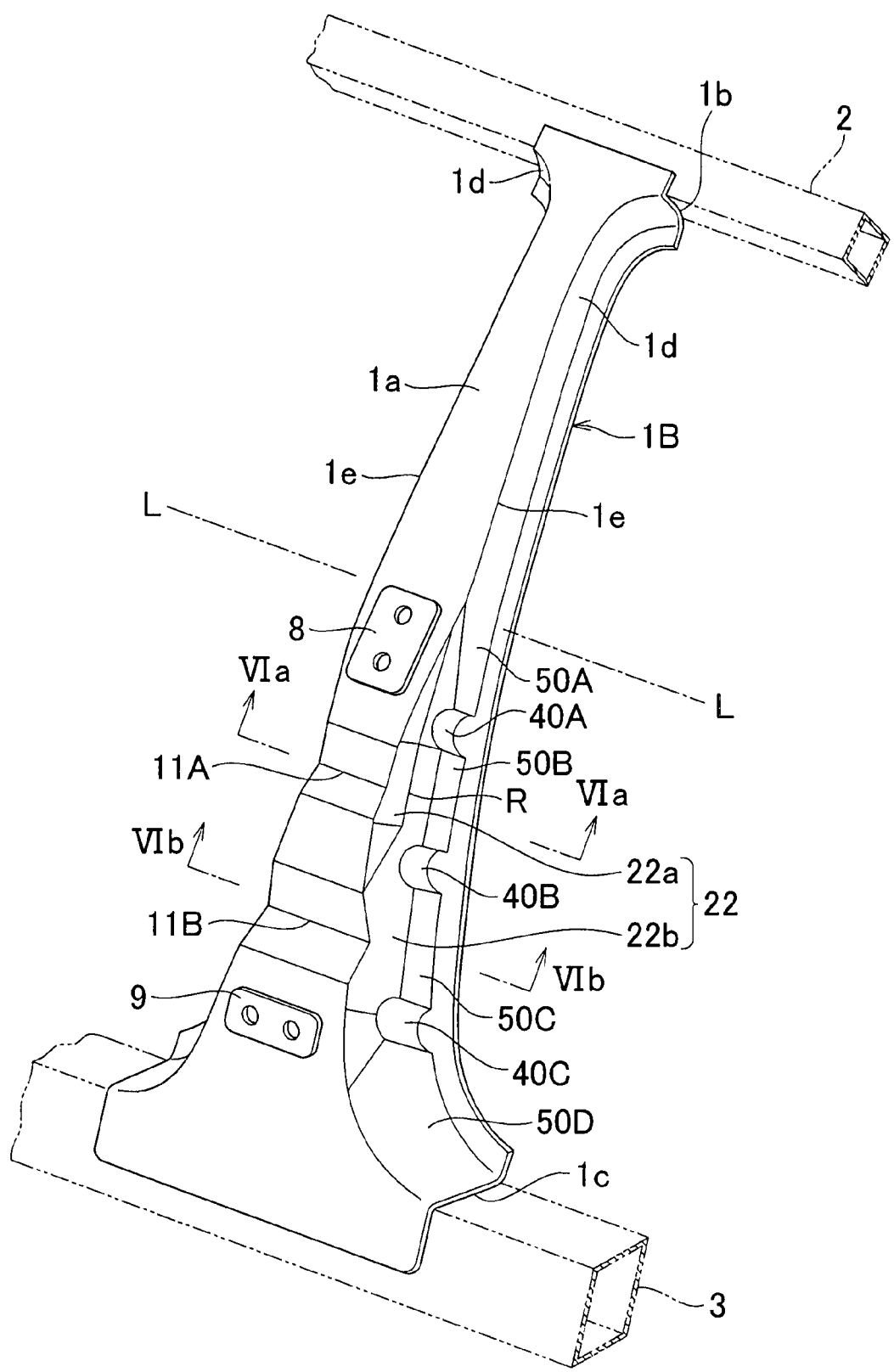
FIG. 5 is a perspective view showing a third embodiment of a reinforcement that is applied to a pillar structure in accordance with the invention.
Figure 6A:
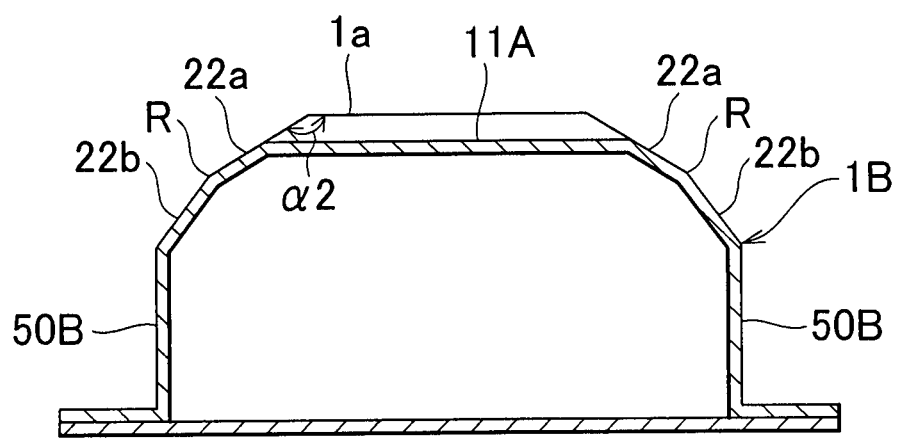
FIG. 6A is a sectional view taken along line VIa-VIa in FIG. 5.
Figure 6B:
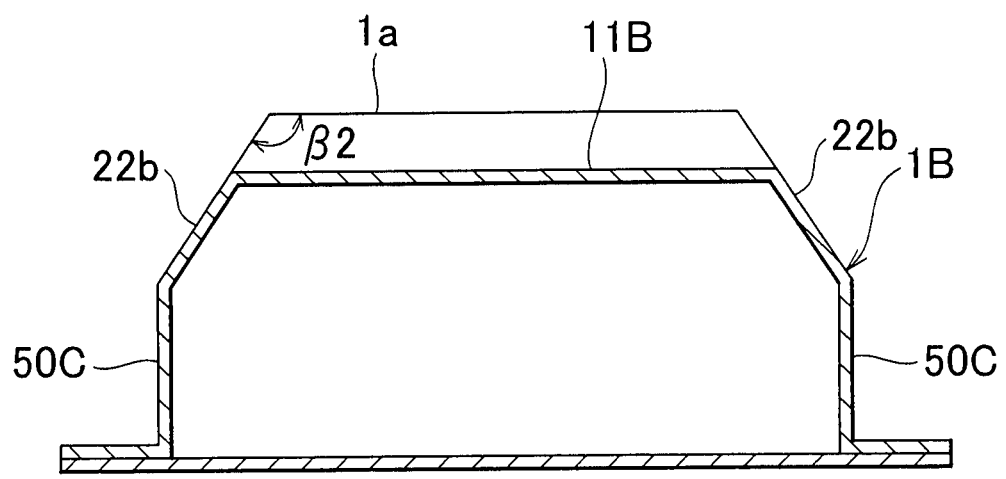
FIG. 6B is a sectional view taken along line VIb-VIb in FIG. 5.

As shown in FIG. 5 and FIGS. 6A and 6B, an obverse face 1a of a reinforcement 1B of a center pillar has beads (buckling portions) 11A and 11B, which are provided in the stated order from above between the upper hinge seat portion 8 and the lower hinge seat portion 9. Both of the upper hinge seat portion 8 and the lower hinge seat portion 9 are positioned below the beltline L. The groove of the bead 11B has a greater depth than the groove of the bead 11A. Therefore, the buckling strength of the bead 11B is lower than the buckling strength of the bead 11A. The beads 11A and 11B serve as starting points when the reinforcement 1A buckles in response to an external force.

Beads 40A, 40B and 40C are formed in the side face 1d on either side of the obverse face 1a. Accordingly, each of the side faces 1d is divided into side faces 50A, 50B, 50C and 50D.

Strain reducing face portions 22 are formed on two ridge portions 1e positioned at both sides of the obverse face 1a of the reinforcement 1B. The strain reducing face portions 22 are positioned adjacent to the beads 11A and 11B in the lateral direction of the reinforcement 1B. The strain reducing face portions 22 are formed as chamfered ridge portions 1e. Each strain reducing face portion 22 extends in the vertical (longitudinal) direction of the reinforcement 1B.

Each strain reducing face portion 22 includes strain reducing face portions 22a and 22b. The strain reducing face portion 22b is provided adjacent to the bead 11B and extends from a height position corresponding to the upper hinge seat portion 8 to a height position corresponding to near the height position of the lower hinge seat portion 9. The strain reducing face portion 22a is provided at a height position corresponding to the bead 11A, between the strain reducing face portion 22b and the bead 11A in the lateral direction of the reinforcement 1B. That is, one lateral end of each strain reducing face portion 22a is adjacent to the bead 11A, and the other lateral end thereof is adjacent to each strain reducing face portion 22b.

Furthermore, the inclination angle α2 of the strain reducing face portion 22a relative to the obverse face 1a of the reinforcement 1B (i.e., the open angle between the strain reducing face portion 22a and the obverse face 1a), as shown in FIG. 6A, is gentler (greater in the open angle) than the inclination angle β2 of the strain reducing face portion 22b relative to the obverse face 1a of the reinforcement 1B (i.e., the open angle between the strain reducing face portion 22b and the obverse face 1a), as shown in FIG. 6B. With this configuration, the strain reducing face portion 22a and the strain reducing face portion 22b on each side of the obverse face 1a, which have different inclination angles relative to the obverse face 1a, are connected, so that a ridge line R is formed at the interface between the strain reducing face portion 22a and the strain reducing face portion 22b.

The reinforcement 1B as described above may be formed by pressing a high-tensile steel sheet.

As described above, the strain reducing face portions 22a adjacent to the bead 11A, which have high buckling strength, are connected to the obverse face 1a at a gentle inclination angle α2, as in the second embodiment. Therefore, the strain that occurs starting at the high buckling strength bead 11A can be more suitably reduced than in the case where the strain reducing face portions are connected to the bead at a sharp inclination angle. Thus, strain caused by buckling can be more suitably reduced according to the buckling strengths of the beads 11A and 11B.

Besides, because the strain reducing face portions 22a and 22b whose inclination angles are different from each other are connected, the strain that occurs in the strain reducing face portions 22b when the bead 11B buckles can be restrained from propagating to the strain reducing face portions 22a via the interfaces (portions of the ridge lines R) between the strain reducing face portions 22a and the strain reducing face portions 22b. Due to this, the other bead 11A can buckle without being affected by the strain of the bead 11B that buckles earlier, so that a more suitable deformation mode can be obtained.

In addition, the strain caused by buckling can be reduced even if the reinforcement 1B is formed from a high-tensile steel sheet with low extensibility. Therefore, it is possible to facilitate control of the deformation mode of the pillar. That is, even if the entire reinforcement 1B is formed from a high-tensile steel sheet in order to secure a strength of the upper portion of the reinforcement 1B above the beltline L, the lower portion of the reinforcement 1B below the beltline L can deform at the buckling position without involving large strain. Thus, the entire reinforcement 1B may be formed of a single kind of material, and therefore it is possible to facilitate the production process and reduce the production cost.

Furthermore, the beads 40A to 40C in the side faces 1d restrain complete crush of the lower portion of the reinforcement 1B, and thereby restrain deformation of the pillar. In addition, the amount of crush of the reinforcement 1B can be controlled by changing the heights of the beads 40A to 40C according to the inclination angles of the strain reducing face portions 22a and 22b relative to the obverse face 1a.

Fourth Embodiment

Figure 7:
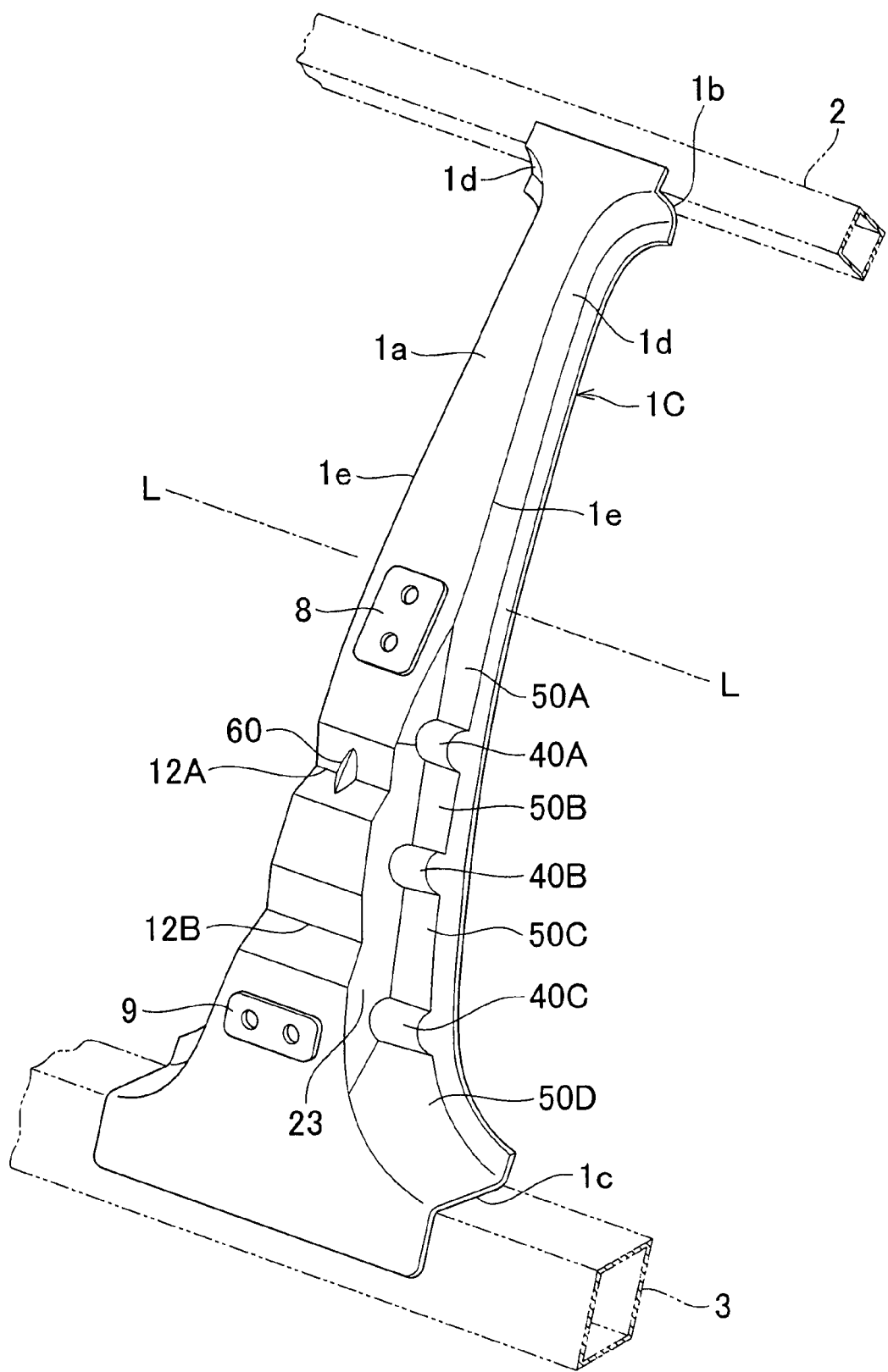
FIG. 7 is a perspective view showing a fourth embodiment of the reinforcement that is applied to a pillar structure in accordance with the invention.

As shown in FIG. 7, an obverse face 1a of a reinforcement 1C of a center pillar has beads (buckling portions) 12A and 12B, which are provided in the stated order from above between the upper hinge seat portion 8 and the lower hinge seat portion 9. Both of the upper hinge seat portion 8 and the lower hinge seat portion 9 are positioned below the beltline L. The beads 12A and 12B each form a V-shape groove that extends in the lateral direction of the reinforcement 1C, and the groove of the bead 12A has a same depth as the groove of the bead 12B. A bottom portion of the bead 12A is provided with a protrusion 60 that protrudes outward. The beads 12A and 12B serve as starting points when the reinforcement 1C buckles in response to an external force.

Beads 40A, 40B and 40C are formed in the side face 1d on each side of the obverse face 1a. The bead 40A is provided at a height position above the bead 12A. The bead 40B is provided at a height position between the beads 12A and 12B. The bead 40C is provided at a height position below the bead 12B.

Strain reducing face portions 23 are formed on two ridge portions 1e positioned at both sides of the obverse face 1a of the reinforcement 1C. The strain reducing face portions 23 are positioned adjacent to the beads 12A and 12B in the lateral direction of the reinforcement 1C. The strain reducing face portions 23 are formed as chamfered ridge portions 1e. Each strain reducing face portion 23 extends in the vertical (longitudinal) direction of the reinforcement 1C. In addition, each strain reducing face portion 23 is inclined relative to the obverse face 1a of the reinforcement 1C.

The reinforcement 1C as described above may be formed by pressing a high-tensile steel sheet.

As described above, the strain reducing face portions 23 are adjacent to the beads 12A and 12B, as in the first embodiment.

Accordingly, the strain that occurs starting at the beads 12A and 12B may be reduced, so that an ideal deformation mode of the pillar may be obtained.

In addition, the protrusion 60 provided on the bottom portion of the bead 12A inhibits deformation of the bead 12A so as to narrow the width of the V groove bead 12A when the bead 12A buckles. That is, the protrusion 60 provided on the bottom portion of the bead 12A increases the buckling strength of the bead 12A. Thus, by providing the protrusion 60 only on the bottom portion of the bead 12A, the buckling strengths of the beads 12A and 12B juxtaposed in the vertical direction of the reinforcement 1C can be made different from each other. Therefore, the pillar can deform in a desired deformation mode.

In addition, by providing the strain reducing face portions 23, the strain caused by buckling can be reduced even if the reinforcement 1C is formed from a high-tensile steel sheet with low extensibility. Therefore, it is possible to facilitate control of the deformation mode of the pillar. That is, even if the entire reinforcement 1C is formed from a high-tensile steel sheet in order to secure a strength of the upper portion of the reinforcement 1C above the beltline L, the lower portion of the reinforcement 1C below the beltline L can deform at the buckling position without involving large strain. Thus, the entire reinforcement 1C may be formed of a single kind of material, and therefore it is possible to facilitate the production process and reduce the production cost.

Furthermore, the beads 40A to 40C in the side faces 1d restrain complete crush of the lower portion of the reinforcement 1C, and thereby restrain deformation of the pillar. In addition, the amount of crush of the reinforcement 1C can be controlled by changing the heights of the beads 40A to 40C according to the inclination angles of the strain reducing face portions 23 relative to the obverse face 1a.

Fifth Embodiment

Figure 8:
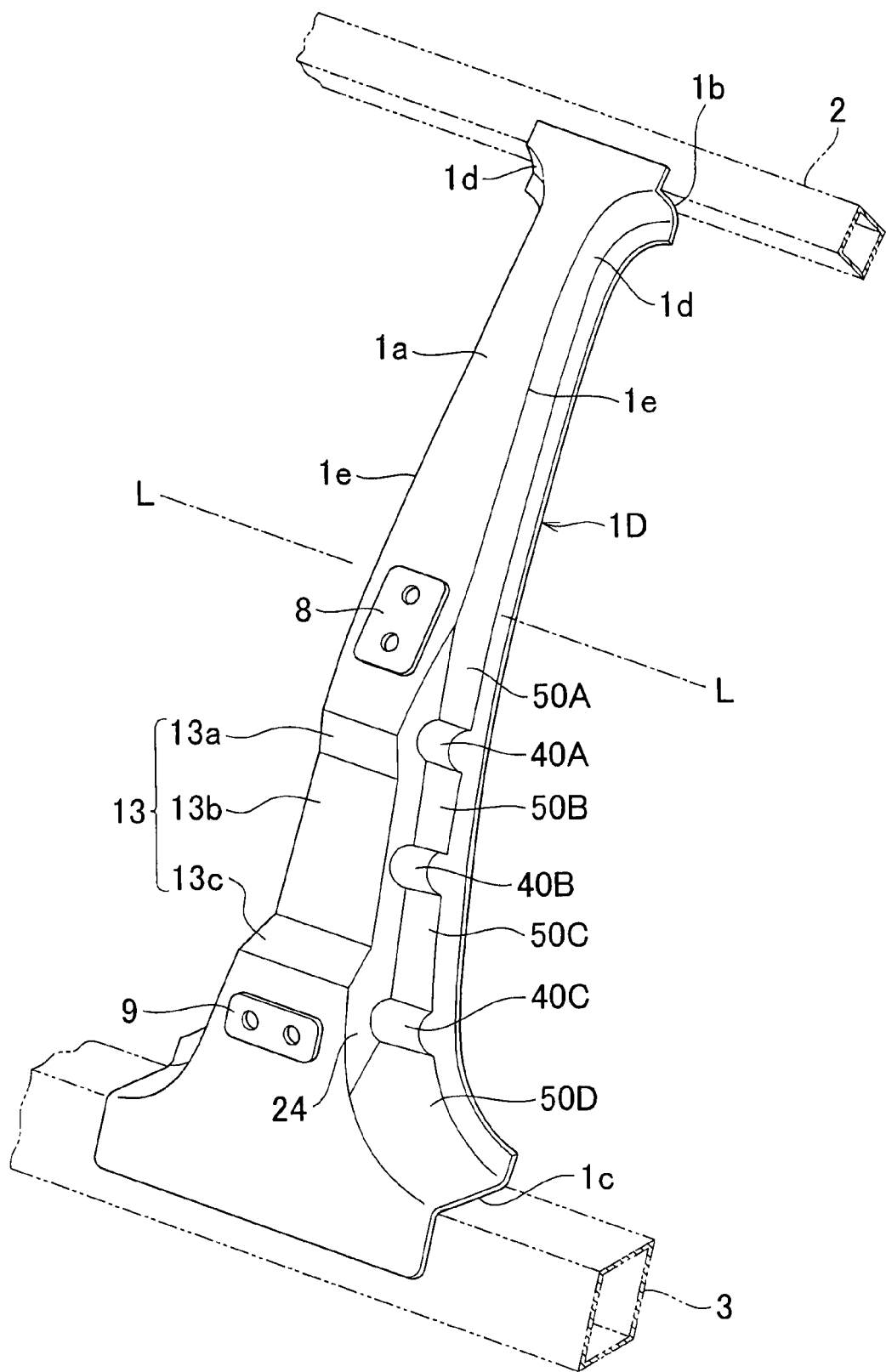
FIG. 8 is perspective view showing a fifth embodiment of the reinforcement that is applied to a pillar structure in accordance with the invention.

As shown in FIG. 8, an obverse face 1a of a reinforcement 1D of a center pillar includes a recessed portion 13 that is provided between the upper hinge seat portion 8 and the lower hinge seat portion 9, both of which are positioned below the beltline L. The recessed portion 13 serves as a buckling portion.

The recessed portion 13, formed as a groove, extends in the lateral direction of the reinforcement 1D. The recessed portion 13 is constructed of a bottom face portion 13b that extends in the vertical (longitudinal) direction of the reinforcement 1D, an upper wall portion 13a that is connected to an upper end of the bottom face portion 13b, and a lower wall portion 13c that is connected to a lower end of the bottom face portion 13b. A rising angle between the upper wall portion 13a and the bottom face portion 13b differs from the rising angle between the lower wall portion 13c and the bottom face portion 13b. Specifically, the rising angle of the lower wall face portion 13c is steeper (smaller) than the rising angle of the upper wall face portion 13a. In the recessed portion 13, an upper interface between the upper wall face portion 13a and the bottom face portion 13b and a lower interface between the lower wall face portion 13c and the bottom face portion 13b serve as starting points of buckling when an external force acts on the reinforcement 1D. The lower interface has a larger fall from the obverse face 1a than the upper wall face 1a.

Beads 40A, 40B and 40C are formed in the side face 1d on each side of the obverse face 1a. Each of he beads 40A, 40B and 40C is provided at a height position between the upper hinge seat portion 8 and the lower hinge seat portion 9.

Strain reducing face portions 24 are formed on two ridge portions 1e positioned at both sides of the obverse face 1a of the reinforcement 1D. The strain reducing face portions 24 are positioned adjacent to the recessed portion 13 in the lateral direction of the reinforcement 1D. The strain reducing face portions 24 are formed as chamfered ridge portions 1e. Each strain reducing face portion 24 extends in the vertical direction of the reinforcement 1D. In addition, each strain reducing face portion 24 is inclined relative to the obverse face 1a of the reinforcement 1D.

The reinforcement 1D as described above may be formed by pressing a high-tensile steel sheet.

In general, if the reinforcement provided with a recessed portion receives an external force, the buckling strength of an interface between a wall face portion and a bottom face portion of the recessed portion decreases as the rising angle between the wall face portion and the bottom face portion becomes steeper. Therefore, in this embodiment, the buckling strength of the upper interface is higher than the buckling strength of the lower interface. Thus, because the upper wall face portion 13a has a different rising angle from that of the lower wall face portion 13c, buckling portions with different buckling strengths, which are juxtaposed in the vertical direction of the reinforcement 1D, is provided so that the pillar can deform in a desired deformation mode. When a side collision occurs, the lower interface with lower buckling strength buckles first, and then the upper interface with higher buckling strength buckles. Thus, buckling of the reinforcement 1D starts at the lower side thereof, so that a more suitable deformation mode of the pillar can be obtained.

The strain reducing face portions 24 are adjacent to the recessed portion 13, as in the first embodiment. Accordingly, the strain that occurs starting at the lower interface and the upper interface can be reduced, so that an ideal deformation mode of the pillar can be obtained.

In addition, by providing the strain reducing face portions 24, the strain caused by buckling can be reduced even if the reinforcement 1D is formed from a high-tensile steel sheet with low extensibility. Therefore, it is possible to facilitate control of the deformation mode of the pillar. That is, even if the entire reinforcement 1D is formed from a high-tensile steel sheet in order to secure a strength of the upper portion of the reinforcement 1D above the beltline L, the lower portion of the reinforcement 1D below the beltline L can deform at the buckling position without involving large strain. Thus, the entire reinforcement 1D may be formed of a single kind of material, and therefore it is possible to facilitate the production process and reduce the production cost.

Furthermore, the beads 40A to 40C in the side faces 1d restrain complete crush of the lower portion of the reinforcement 1D, and thereby restrain deformation of the pillar. In addition, the amount of crush of the reinforcement 1D can be controlled by changing the heights of the beads 40A to 40C according to the inclination angles of the strain reducing face portions 24 relative to the obverse face 1a.

Sixth Embodiment

Figure 9:
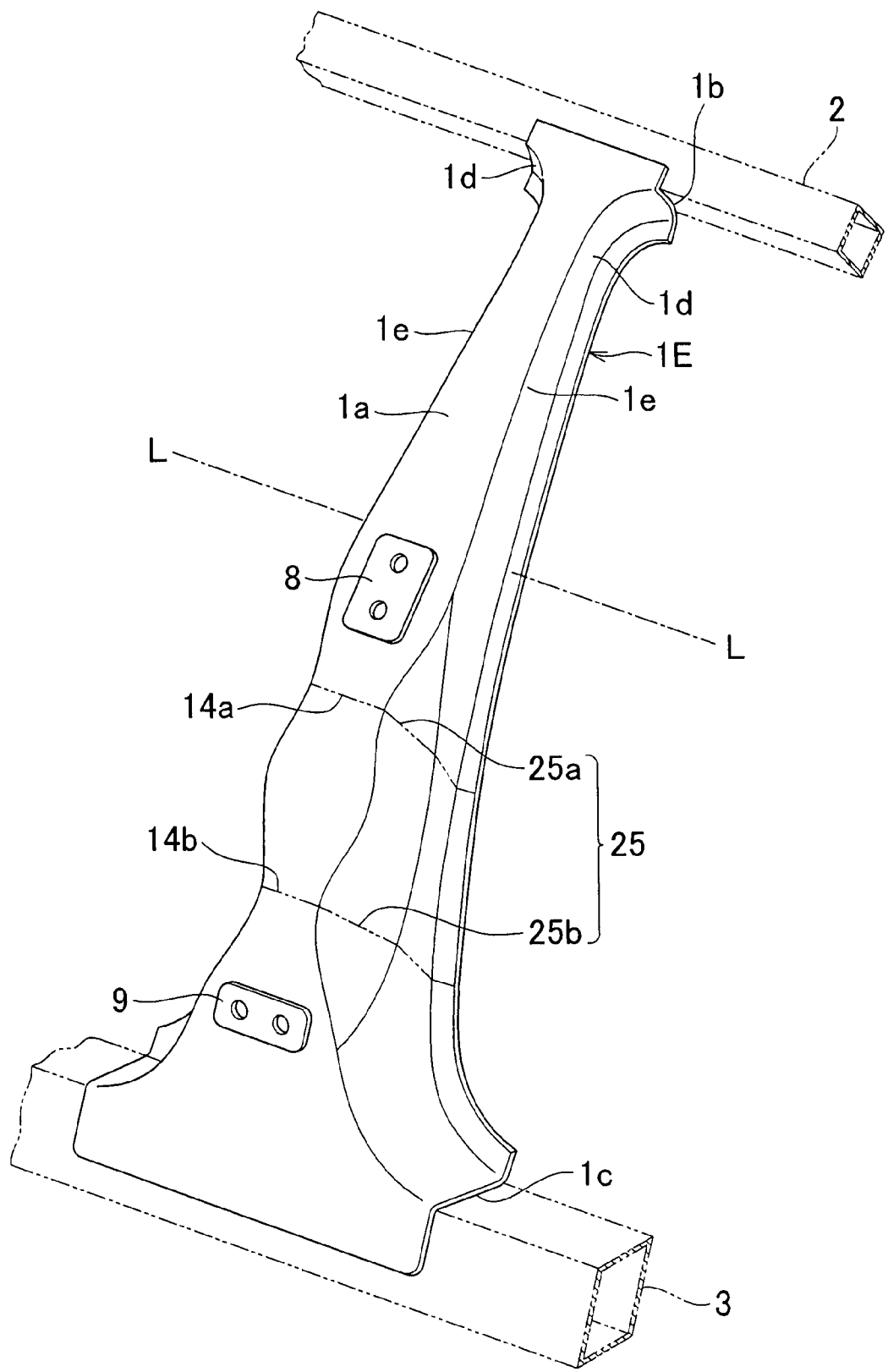
FIG. 9 is a perspective view showing a sixth embodiment of the reinforcement that is applied to a pillar structure in accordance with the invention.

As shown in FIG. 9, an obverse face 1a of a reinforcement 1E of a center pillar includes a wide constricted portion 14a and a narrow constricted portion 14b, which are provided in the stated order from above between the upper hinge seat portion 8 and the lower hinge seat portion 9. Both of the upper hinge seat portion 8 and the lower hinge seat portion 9 are positioned below the beltline L. Both of the wide constricted portion 14a and the narrow constricted portion 14b are formed by reducing width of the obverse face 1a of the reinforcement 1E. The wide constricted portion 14a has a larger width (length in a lateral direction of the reinforcement 1E) than the narrow constricted portion 14b. In this embodiment, the wide constricted portion 14a and the narrow constricted portion 14b serve as buckling portions.

Strain reducing face portions 25 are formed on two ridge portions 1e positioned at both sides of the obverse face 1a of the reinforcement 1E. The strain reducing face portions 25 extend from the height position corresponding to the upper hinge seat portion 8 to the height position corresponding to the height position of the lower hinge seat portion 9. The strain reducing face portions 25 are formed as chamfered ridge portions 1e. Each strain reducing face portion 25 extends in the vertical (longitudinal) direction of the reinforcement 1E.

The inclination angle of each strain reducing face portion 25 relative to the obverse face 1a varies in the vertical direction of the reinforcement 1E. Specifically, the inclination angle of the strain reducing face portion 25 relative to the obverse face 1a at a site 25a adjacent to the wide constricted portion 14a (hereinafter, referred to as "steep inclination site") is steeper than the inclination angle of the strain reducing face portion 25 relative to the obverse face 1a at a site 25b adjacent to the narrow constricted portion 14b (hereinafter, referred to as "gentle inclination site").

Thus, in the lower portion of the reinforcement 1E below the beltline L, the width of the obverse face 1a is reduced to form the wide constricted portion 14a and the narrow constricted portion 14b, and the strain reducing face portion 25 is provided adjacent to the wide constricted portion 14a and the narrow constricted portion 14b.

In the lower portion of the reinforcement 1E below the beltline L, the wide constricted portion 14a and the narrow constricted portion 14b, which are formed by reducing the width of the obverse face 1a, serve as starting points of buckling when an external force acts on the reinforcement 1E.

The reinforcement 1E as described above may be formed by pressing a high-tensile steel sheet.

As described above, because the gentle inclination site 25b is provided adjacent to the narrow constricted portion 14b, the buckling strength of the narrow constricted portion 14b is lower than that of the wide constricted portion 14a, which is adjacent to the steep inclination site 25a. Thus, by adjusting the width of the obverse face 1a and the inclination angle of each strain reducing face portion 25 in the above-described manner, it is possible to provide buckling portions that are juxtaposed in the vertical direction of the reinforcement 1E and that are different in the buckling strength from each other. Therefore, the pillar may deform in a desired deformation mode. In addition, when a side collision occurs, the narrow constricted portion 14b with lower buckling strength buckles first, and then the wide constricted portion 14a with higher buckling strength buckles. Thus, buckling of the reinforcement 1E starts at the 20, lower side thereof, so that a more suitable deformation mode of the pillar can be obtained.

In addition, by providing the strain reducing face portion 25, the strain caused by buckling can be reduced even if the reinforcement 1E is formed from a high-tensile steel sheet with low extensibility. Therefore, it is possible to facilitate control of the deformation mode of the pillar. That is, even if the entire reinforcement 1E is formed from a high-tensile steel sheet in order to secure a strength of the upper portion of the reinforcement 1E above the beltline L, the lower portion of the reinforcement 1E below the beltline L can deform at the buckling position without involving large strain. Thus, the entire reinforcement 1E may be formed of a single kind of material, and therefore it is possible to facilitate the production process and reduce the production cost.

Seventh Embodiment

Figure 10:
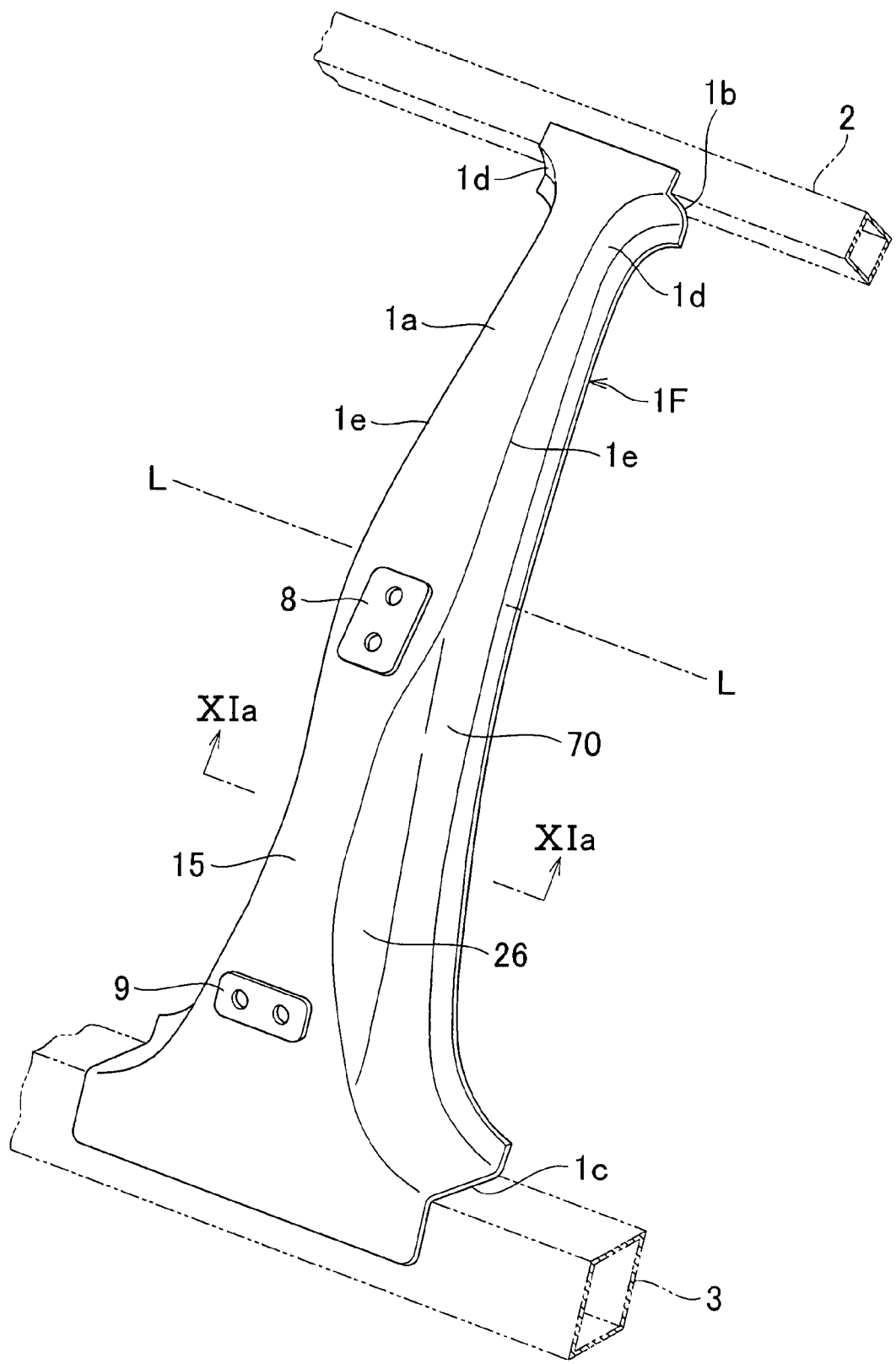
FIG. 10 is a perspective view showing a seventh embodiment of the reinforcement that is applied to a pillar structure in accordance with the invention.
Figure 11A:
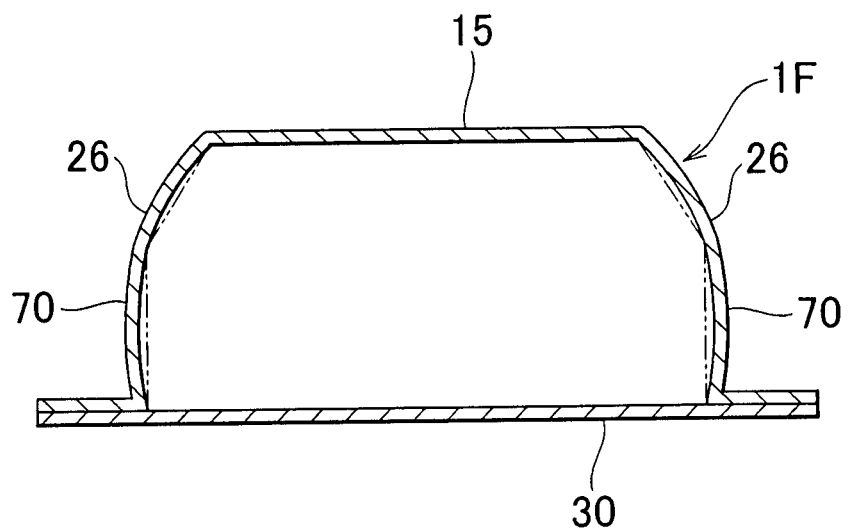
FIG. 11A is a sectional view taken along line XIa-XIa in FIG. 10.

As shown in FIG. 10 and FIG. 11A, an obverse face 1a of a reinforcement 1F of a center pillar has a narrowed portion (buckling portion) 15, which is provided between the upper hinge seat portion S and the lower hinge seat portion 9. Both of the upper hinge seat portion 8 and the lower hinge seat portion 9 are positioned below the beltline L. The narrowed portion 15 is formed by reducing the obverse face 1a of the reinforcement 1F.

Strain reducing face portions 26 are formed on two ridge portions 1e positioned at both sides of the obverse face 1a of the reinforcement 1F. The strain reducing face portions 26 extend from the height position corresponding to the upper hinge seat portion 8 to the height position corresponding to the height position of the lower hinge seat portion 9. The strain reducing face portions 26 are formed as chamfered ridge portions 1e. Each strain reducing face portion 26 extends in the vertical (longitudinal) direction of the reinforcement 1F.

Portions 70 of the side faces 1d (hereinafter, referred to as "side face curved portions 70") adjacent to the strain reducing face portions 26, and the strain reducing face portions 26 are curved outward in the lateral direction of the reinforcement 1F (see FIG. 11A in particular). Two-dot chain lines in FIG. 11A show a state in which the strain reducing face portions 26 and the side face curved portions 70 of the side faces 1d are not curved.

The reinforcement 1F as described above may be formed by pressing a high-tensile steel sheet.

Figure 11B:
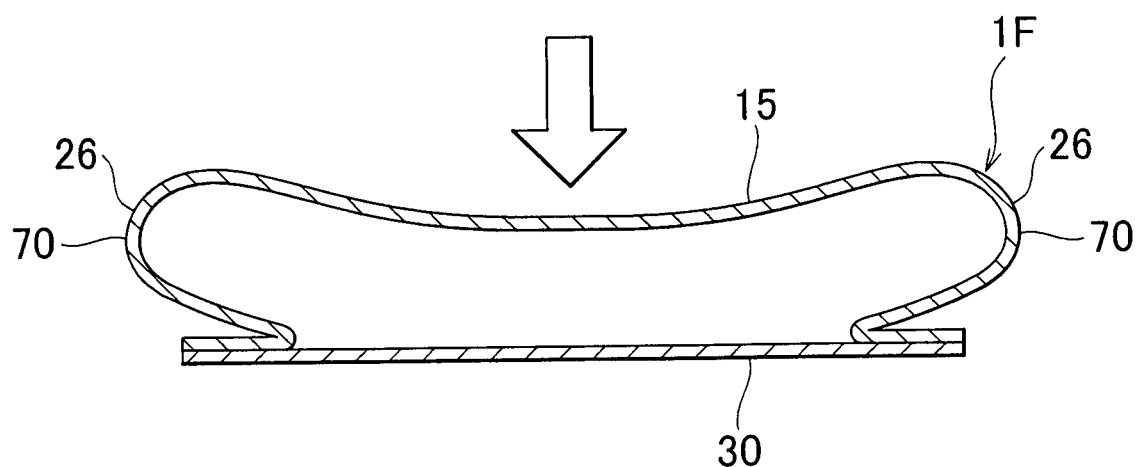

With the construction described above, as shown in FIG. 11B, when the obverse face 1a of the reinforcement 1F receives force and the reinforcement 1F buckles by a side collision, the strain reducing face portions 26 and the side face curved portions 70 of the side faces 1d deform to protrude outward, without deforming to fall inward. The deformation in this manner is caused by the configurations of the strain reducing face portions 26 and the side face curved portions 70 of the side faces 1d that are curved outward. Accordingly, the strain occurs in the strain reducing face portions 26 and the side face curved portions 70 of the side faces 1d can be reduced, so that a more suitable deformation mode can be obtained.

In addition, because the narrowed portion 15 is formed by narrowing the obverse face 1a and the strain reducing face portions 26 are provided adjacent to the narrowed portion 15 in the lower portion of the reinforcement 1F below the beltline L, the inclination angle of each strain reducing face portion 26 relative to the narrowed portion 15 becomes gentle. Due to this construction, the buckling strength of the lower portion of the reinforcement 1F below the beltline L, which is provided with the narrowed portion 15 and the strain reducing face portions 26, is lower than the buckling strength of the upper portion of the reinforcement 1F above the beltline L. Therefore, the lower portion of the reinforcement 1F can buckle first when a side collision occurs, so that a more suitable deformation mode can be obtained.

The strain reducing face portions 26 are adjacent to the narrowed portion 15, as in the first embodiment. Accordingly, the strain that occurs starting at the narrowed portion 15 can be reduced, so that an ideal deformation mode of the pillar can be obtained.

In addition, by providing the strain reducing face portions 26, the strain caused by buckling may be reduced even if the reinforcement 1F is formed from a high-tensile steel sheet with low extensibility. Therefore, it is possible to facilitate control of the deformation mode of the pillar. That is, even if the entire reinforcement 1F is formed from a high-tensile steel sheet in order to secure a strength of the upper portion of the reinforcement 1F above the beltline L, the lower portion of the reinforcement 1F below the beltline L can deform at the buckling position without involving large strain. Thus, the entire reinforcement 1F may be formed of a single kind of material, and therefore it is possible to facilitate the production process and reduce the production cost.

In the seventh embodiment, the strain reducing face portions 26 and the side face curved portions 70 of the side faces 1d are both curved outward. However, as long as at least the strain reducing face portions 26 or at least the side face curved portions 70 of the side faces 1d are curved outward, substantially the same effects as described above can be obtained.

It should be understood that the invention is not restricted to the foregoing embodiments.

Besides, the invention may also be applied to a front pillar (A pillar) as well as a rear pillar (C pillar).

The invention claimed is:

1. A vehicle pillar structure comprising:
a reinforcement that is provided in a vehicle pillar and that includes a buckling portion and a strain reducing face portion, wherein
the buckling portion serves as a starting point of buckling;
the strain reducing face portion is adjacent to the buckling portion in a lateral direction of the reinforcement and reduces strain that occurs when the buckling;
a plurality of buckling portions are juxtaposed in a vertical direction of the reinforcement, and a plurality of strain reducing face portions are adjacent to the buckling portions;
each buckling portion has a different buckling strength; and
each strain reducing face portion has a different inclination an angle relative to a first face of the reinforcement in which the buckling portions are formed, and the strain reducing face portions are connected to each other.

2. The vehicle pillar structure according to claim 1, wherein:
the strain reducing portions include a first strain reducing portion and a second strain reducing portion; and
the first strain reducing portion is provided between one of the buckling portions and the second strain reducing portion in the lateral direction of the reinforcement.

3. A vehicle pillar structure comprising:
a reinforcement that is provided in a vehicle pillar and that includes a buckling portion and a strain reducing face portion, wherein:
the buckling portion serves as a starting point of buckling;
the strain reducing face portion is adjacent to the buckling portion in a lateral direction of the reinforcement and reduces strain that occurs when the buckling;
a plurality of buckling portions are juxtaposed in a vertical direction of the reinforcement, and the plurality of buckling portions are constructed of V-shaped grooves whose cross sectional shapes are substantially same;
the buckling portions include a first buckling portion and a second buckling portion; and
a bottom portion of the first buckling portion is provided with a protrusion and the bottom portion of the second buckling portion is not provided with the protrusion.

4. A vehicle pillar structure comprising:
a reinforcement that is provided in a vehicle pillar and that includes a buckling portion and a strain reducing face portion, wherein:
the buckling portion serves as a starting point of buckling;
the strain reducing face portion is adjacent to the buckling portion in a lateral direction of the reinforcement and reduces strain that occurs when the buckling;

the buckling portion is constructed of a recessed portion that is formed in the reinforcement and that includes a bottom face portion, an upper wall portion and a lower wall portion;

the upper wall portion is connected to an upper end of the bottom face portion and the lower wall portion is connected to an lower end of the bottom face portion; and an angle between the upper wall portion and the bottom face portion differs from the angle between the lower wall portion and the bottom face portion.

5. A vehicle pillar structure comprising:

a reinforcement that is provided in a vehicle pillar and that includes a buckling portion and a strain reducing face portion, wherein:

the buckling portion serves as a starting point of buckling;

the strain reducing face portion is adjacent to the buckling portion in a lateral direction of the reinforcement and reduces strain that occurs when the buckling;

the buckling portion is formed in an obverse face of the reinforcement;

the strain reducing face portion is provided between the obverse face and a side face of the reinforcement; and at least one of the strain reducing face portion and the side face is curved outward in the lateral direction of the reinforcement.

6. A vehicle pillar structure comprising:

a reinforcement that is provided in a vehicle pillar and that include a buclkling portion and a strain reducing face portion, wherein;

the buckling portion serves as a starting point of buckling;

the strain reducing face portion is adjacent to the buckling portion in a lateral direction of the reinforcement and reduces strain that occurs when the buckling;

an angle between the strain reducing face portion and the obverse face of the reinforcement is larger than the angle between the side face of the reinforcement and the obverse face of the reinforcement.

7. The vehicle pillar structure according to claim 6, wherein buckling strength of an upper side portion of the buckling portion differs from the buckling strength of a lower side portion of the buckling portion.

8. The vehicle pillar structure according to claim 7, wherein the buckling strength of the lower side portion of the buckling portion is lower than the buckling strength of the upper side portion of the buckling portion.

9. The vehicle pillar structure according to claim 6, wherein a plurality of buckling portions are juxtaposed in a vertical direction of the reinforcement, and each buckling portion has a different buckling strength.

10. The vehicle pillar structure according to claim 9, wherein the buckling strength of the lower buckling portion is lower than the buckling strength of the upper buckling portion.

11. The vehicle pillar structure according to claim 10, wherein:

an upper strain reducing face portion is adjacent to the upper buckling portion and a lower strain reducing face portion is adjacent to the lower buckling portion; and an inclination angle of the upper strain reducing face portion relative to the obverse face of the reinforcement is larger than the inclination angle of the lower strain reducing face portion relative to the obverse face of the reinforcement.

12. The vehicle pillar structure according to claim 10, wherein:

an upper side portion of the strain reducing face portion is adjacent to the upper buckling portion and a lower side portion of the strain reducing face portion is adjacent to the lower buckling portion; and an inclination angle of the upper side portion of the strain reducing face portion relative to the obverse face of the reinforcement is larger than the inclination angle of the lower side portion of the strain reducing face portion relative to the obverse face of the reinforcement.

* * * * *